US011900837B2

(12) United States Patent
Wu

(10) Patent No.: US 11,900,837 B2
(45) Date of Patent: Feb. 13, 2024

(54) METHOD FOR OPERATING ELECTRONIC DEVICE HAVING ROLLABLE DISPLAY PANEL

(71) Applicant: InnoLux Corporation, Miao-Li County (TW)

(72) Inventor: Yuan-Lin Wu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/939,996

(22) Filed: Sep. 8, 2022

(65) Prior Publication Data

US 2023/0110333 A1 Apr. 13, 2023

(30) Foreign Application Priority Data

Oct. 9, 2021 (CN) .......................... 202111177300.3

(51) Int. Cl.
*G09F 9/30* (2006.01)
*G09G 3/00* (2006.01)

(52) U.S. Cl.
CPC ............. *G09F 9/301* (2013.01); *G09G 3/035* (2020.08); *G09G 2380/02* (2013.01)

(58) Field of Classification Search
CPC .... G09F 9/301; G09G 3/035; G09G 2380/02; G09G 3/3266; G09G 3/3275; G06F 3/0488; G06F 3/0481; G06F 3/04886; G06F 1/1626; H05K 5/0086
See application file for complete search history.

(56) References Cited

U.S. PATENT DOCUMENTS

| | | | | |
|---|---|---|---|---|
| 2014/0218375 | A1* | 8/2014 | Kim | G06F 3/0488 345/501 |
| 2017/0147189 | A1* | 5/2017 | Ryu | G06F 3/04886 |
| 2020/0225848 | A1* | 7/2020 | Yoon | G06F 3/0481 |
| 2020/0320908 | A1* | 10/2020 | Kim | G09G 3/3275 |
| 2020/0326752 | A1* | 10/2020 | Jung | G06F 1/1626 |
| 2021/0012751 | A1 | 1/2021 | An | |
| 2022/0180806 | A1* | 6/2022 | Lee | G09G 3/3266 |
| 2022/0189408 | A1* | 6/2022 | Jo | G09G 3/3275 |
| 2022/0415226 | A1* | 12/2022 | Kim | H05K 5/0086 |

FOREIGN PATENT DOCUMENTS

| | | |
|---|---|---|
| CN | 111868817 A | 10/2020 |

* cited by examiner

*Primary Examiner* — Richard J Hong
(74) *Attorney, Agent, or Firm* — Winston Hsu

(57) ABSTRACT

A method for operating an electronic device having a display panel is provided. The display panel has a first region and a second region, in which the first region is out of a case, and the second region is capable of being shielded by the case. First, a first image is displayed in the first region. Then, a second image is displayed in the second region at a first time point when the second region is shielded by the case. After that, the second region out of the case is moved at a second time point, in which the first time point is not later than the second time point.

8 Claims, 14 Drawing Sheets

METHOD FOR OPERATING ELECTRONIC DEVICE HAVING ROLLABLE DISPLAY PANEL

BACKGROUND OF THE DISCLOSURE

1. Field of the Disclosure

The present disclosure relates to a method for operating an electronic device with a display panel and particularly to a method for operating an electronic device capable of being expanded or rolled up.

2. Description of the Prior Art

Recently, display panels in electronic devices may be expanded or rolled up according to usage requirements. However, when the conventional display panel is expanded or rolled up, a sequence of images displayed from the display panel are easily discontinuous, or flicker may be generated. Accordingly, the present disclosure proposes a method for operating an electronic device with a display panel.

SUMMARY OF THE DISCLOSURE

According to some embodiments, the present disclosure provides a method for operating an electronic device having a display panel, in which the display panel has a first region and a second region. The first region is out of a case, and the second region is capable of being shielded by the case. First, a first image is displayed in the first region. Then, a second image is displayed in the second region at a first time point when the second region is shielded by the case. After that, the second region out of the case is moved at a second time point, in which the first time point is not later than the second time point.

These and other objectives of the present disclosure will no doubt become obvious to those of ordinary skill in the art after reading the following detailed description of the embodiment that is illustrated in the various figures and drawings.

DETAILED DESCRIPTION

Figure 1:
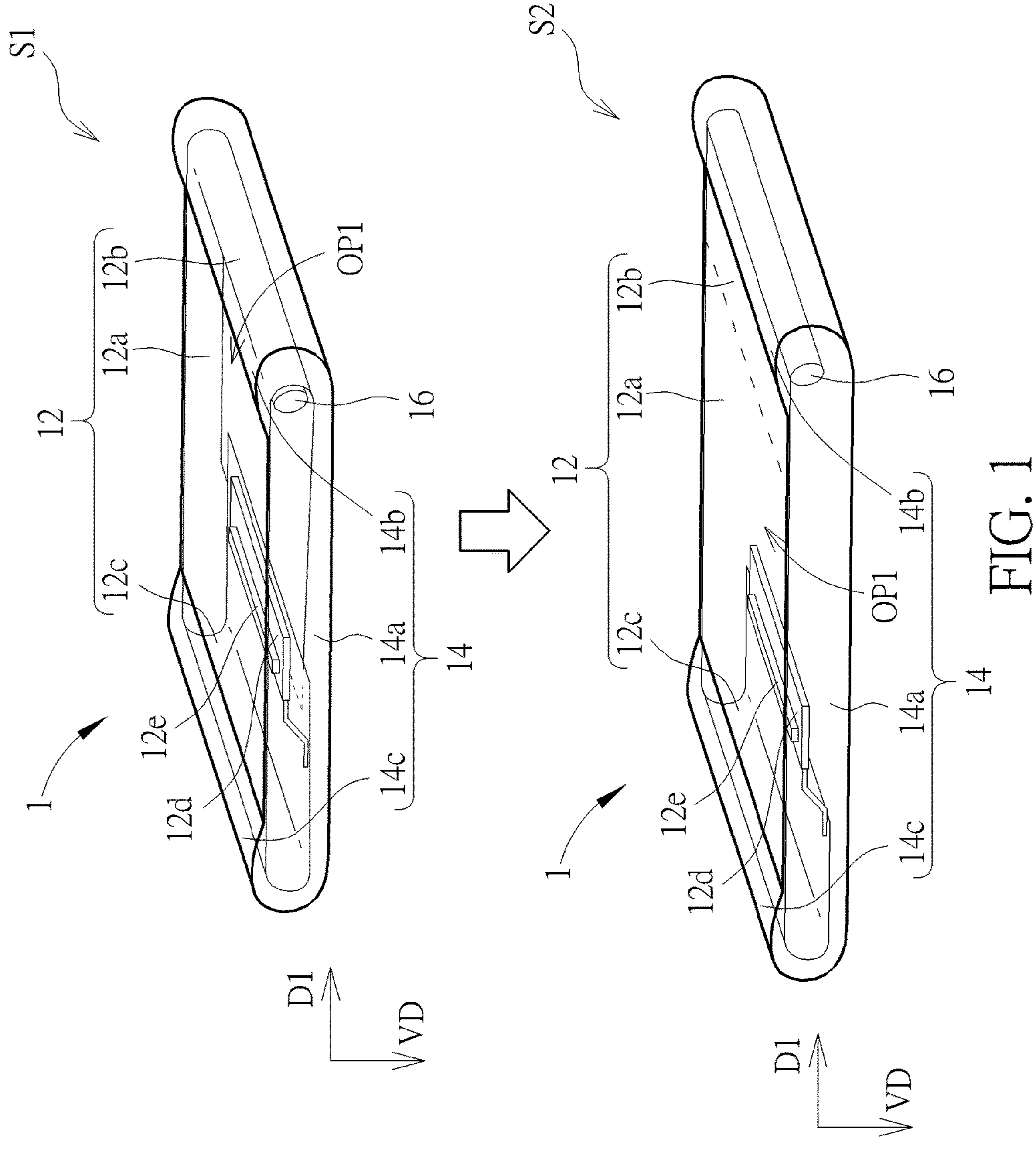
FIG. 1 schematically illustrates an electronic device expanded from a first status to a second status according to an embodiment of the present disclosure.

The contents of the present disclosure will be described in detail with reference to specific embodiments and drawings. It is noted that, for purposes of illustrative clarity and being easily understood by the readers, the following drawings may be simplified schematic diagrams, and components therein may not be drawn to scale. The numbers and sizes of the components in the drawings are just illustrative and are not intended to limit the scope of the present disclosure.

Certain terms are used throughout the specification and the appended claims of the present disclosure to refer to specific components. Those skilled in the art should understand that electronic equipment manufacturers may refer to a component by different names, and this document does not intend to distinguish between components that differ in name but not function. In the following description and claims, the terms “comprise”, “include” and “have” are open-ended fashion, so they should be interpreted as “including but not limited to . . . ”.

The ordinal numbers used in the specification and the appended claims, such as “first”, “second”, etc., are used to describe the components of the claims. It does not mean that the component has any previous ordinal numbers, nor does it represent the order of a certain component and another component, or the sequence in a manufacturing method. These ordinal numbers are just used to make a claimed component with a certain name be clearly distinguishable from another claimed component with the same name. Thus, a first component mentioned in the specification may be called a second component.

Spatially relative terms, such as "above", "on", "beneath", "below", "under", "left", "right", "before", "front", "after", "behind" and the like, used in the following embodiments just refer to the directions in the drawings and are not intended to limit the present disclosure. It may be understood that the components in the drawings may be disposed in any kind of formation known by those skilled in the related art to describe or illustrate the components in a certain way.

In addition, when one component or layer is "on" or "above" another component or layer, or is connected to another component or layer, it may be understood that the component or layer is directly on the another component or layer, or is directly connected to the another component or layer, and alternatively another component or layer may be between the one component or layer and the another component or layer (indirectly). On the contrary, when the component or layer is "directly on" the another component or layer or is "directly connected to" the another component or layer, there is no intervening component or layer between the component or layer and the another component or layer.

As disclosed herein, the terms "approximately", "about", and "substantially" generally mean within 10%, 5%, 3%, 2%, 1%, or 0.5% of the reported numerical value or range. The quantity disclosed herein is an approximate quantity, that is, without a specific description of "approximately", "about", "substantially", the quantity may still include the meaning of "approximately", "about", and "substantially".

It should be understood that, when a component is "electrically connected to" or "coupled to" another component, there is other component connected between the component and the another component to connect the component to the another component, or there is no component between the component and the another component, such that the component is directly electrically connected to the another component. When a component is "directly electrically connected to" or "directly coupled to" another component, no other components are inserted therebetween, and the component is directly connected to the another component.

It should be understood that according to the following embodiments, features of different embodiments may be replaced, recombined or mixed to constitute other embodiments without departing from the spirit of the present disclosure. The features of various embodiments may be mixed arbitrarily and used in different embodiments without departing from the spirit of the present disclosure or conflicting.

Unless otherwise defined, all terms (including technical and scientific terms) used herein have the same meaning as commonly understood by those skilled in the art. It should be understood that these terms, such as those defined in commonly used dictionaries, should be interpreted as having meaning consistent with the relevant technology and the background or context of the present disclosure, and should not be interpreted in an idealized or excessively formal way, unless there is a special definition in the embodiments of the present disclosure.

In the present disclosure, the electronic device may have a display function and may optionally include an optical sensing, image detecting, touching sensing, or antenna function, other suitable functions or any combination thereof, but not limited thereto. In some embodiments, the electronic device may include tiled device, but not limited thereto. The electronic device may include liquid crystal molecule, light-emitting diode (LED), quantum dots material, a fluorescent material, a phosphor material, other suitable materials, or any combination thereof, but not limited thereto. The LED may for example include organic light-emitting diode (OLED), micro light-emitting diode (micro-LED) or mini light-emitting diode (mini-LED), or quantum dot light-emitting diode (e.g., QLED or QDLED), but not limited thereto. In addition, the electronic device may be a color display device or a single color display device. The appearance of the electronic device may be rectangular, circular, polygonal, a shape with curved edges, curved or other suitable shapes.

FIG. 1 schematically illustrates an electronic device expanded from a first status to a second status according to an embodiment of the present disclosure. The first status S1 is, for example, an unexpanded status, and the second status S2 is, for example, an expanded status. As shown in FIG. 1, the electronic device 1 may include a display panel 12 and a case 14, and the display panel 12 may have a first region 12*a* and a second region 12*b*. For example, the first region 12*a* may display a first image, and the second region 12*b* may display a second image. The first image and the second image may constitute a single image, for example, or the first image and the second image may be different images, but not limited thereto. Two situations of the first image and the second image mentioned above will be described in the following FIG. 12 to FIG. 15. As mentioned herein, the image may include, for example, a pattern, a film, a text, or any combination thereof, but not limited thereto. A part of the image may optionally be a black image or other color images, but not limited to this. In the embodiment of FIG. 1, the display panel 12 may be disposed in the case 14, and the case 14 may for example have an opening OP1. The opening OP1 may be enlarged or shrunk according to different statuses of the electronic device 1. Specifically, when the electronic device 1 is in the first status S1, the first region 12*a* is for example out of (or exposed by) the case 14. In other words, the first region 12*a* may be defined as a region exposed by the opening OP1 of the case 14 in the first status S1. In addition, the second region 12*b* for example is capable of being shielded by the case 14. More specifically, in a top view direction VD of the electronic device 1, the second region 12*b* may be shielded by the case 14 or exposed by the opening OP1, for example, according to the statuses of the electronic device 1. In detail, the second region 12*b* may be for example shielded by the case 14 in the first status S1 (expanded status), and the second region 12*b* may be moved to be exposed by the opening OP1 of the case 14 in the second status S2 (unexpanded status).

In the embodiment of FIG. 1, the electronic device 1 may include at least one mechanism 16 for switching the statuses (the first status S1 or the second status S2) of the electronic device 1. In some embodiments, the mechanism 16 may include, for example, a reel motor, rollers, or other suitable mechanism. In other embodiments (not shown), the status of the electronic device 1 may be adjusted manually or in other ways by a user.

In some embodiments, the mechanism 16 may be located, for example, on an inside (e.g., a right inside, a left inside, or other insides) of the case 14, but not limited thereto. Taking FIG. 1 as an example, the mechanism 16 may be located on the right inside of the case 14. The second region 12*b* may, for example, be connected to a right side of the first region 12*a*, and through the operation of the mechanism 16, the second region 12*b* of the display panel 12 is expanded or rolled up from the right side of the first region 12*a*, but not limited thereto. In other embodiments (not shown), the electronic device 1 may include two mechanisms 16, and the two mechanisms 16 may for example be disposed on two opposite insides of the case 14, so that the display panel 12 may include for example two second regions 12*b*. These two second regions 12*b* may be respectively connected to two opposite sides of the first region 12*a*, and through operations of different mechanisms 16 respectively, the two second regions 12*b* of the display panel 12 may be respectively expanded or rolled up from two sides of the first region 12*a*, but not limited thereto.

As shown in FIG. 1, the electronic device 1 may be switched from the first status S1 (unexpanded status) to the second status S2 (expanded status). On the contrary, although not shown in the present disclosure, the electronic device 1 may be switched from the second status S2 (expanded status) to the first status S1 (unexpanded status).

In the first status S1 (e.g., unexpanded status) of FIG. 1, the first region 12*a* of the display panel 12 is exposed for example by the case 14, and the second region 12*b* may for example be able to be shielded by the case 14. In the first status S1 of FIG. 1, the first image may be displayed in the first region 12*a*, and the second region 12*b* may optionally display no image. In the first status S1, since the first region 12*a* is exposed by the case 14, the user may view the first image displayed in the first region 12*a*.

In the second status S2 (e.g., expanded status) of FIG. 1, the first region 12*a* of the display panel 12 may be still exposed by the case 14, and the second region 12*b* of the display panel 12 may be moved out of (or to be exposed by) the case 14. In detail, the second region 12*b* may be moved by the operation of the mechanism 16 and is exposed by the opening OP1 of the case 14. Accordingly, in the second status S2, the first region 12*a* and the second region 12*b* may be exposed by the opening OP1 of the case 14, and the user may view the first image displayed by the first region 12*a* and the second image displayed by the second region 12*b*. The first image and the second image may constitute a single image or may be different images respectively, for example.

As shown in FIG. 1, the display panel 12 may for example be flexible. At least a portion of the display panel 12 (e.g., the second region 12*b*) may be bent in the first status S1 to be shielded by the case 14, and in the second status S2, this portion of the display panel 12 may be moved to be exposed by the opening OP1 of the case 14, but not limited thereto.

As shown in FIG. 1, in some embodiments, each of the first region 12*a* and the second region 12*b* of the display panel 12 may include a plurality of pixel units (not shown), and the pixel units in the first region 12*a* may be turned on to display the first image, and the pixel units in the second region 12*b* may be turned on to display the second image. In some embodiments, one of the pixel units may include liquid crystal molecules, a light emitting diode (LED), or a quantum dot (QD) material, a fluorescent material, a phosphor material, other suitable materials, or any combination thereof, but not limited thereto. The light emitting diode may, for example, include an organic light emitting diode (OLED), a micro light emitting diode (micro-LED), a sub-millimeter light emitting diode (mini-LED), or a quantum dot light emitting diode (QLED or QDLED) etc., but not limited thereto.

As shown in FIG. 1, in some embodiments, the display panel 12 may include a peripheral region 12*c* and a display region (that may include the first region 12*a* and the second region 12*b*), and the peripheral region 12*c* may be adjacent to at least one side of the display region, but not limited thereto. As shown in FIG. 1, the peripheral region 12*c* may be connected to a side of the first region 12*a* opposite to the second region 12*b*, but not limited thereto. The peripheral region 12*c* may include peripheral circuits, such as circuits, wires, conductive pads, and the like, but not limited thereto. The circuit may include, for example, a driver circuit, a multiplexer (Mux), a demultiplexer (DeMux), and/or other suitable circuits. In the embodiment of FIG. 1, the peripheral region 12*c* may be shielded for example by the case 14. In some embodiments, the peripheral region 12*c* may optionally not be moved to improve yield of the electronic device 1.

In the embodiment of FIG. 1, the electronic device 1 may include a circuit board 12*d* and/or a driving component 12*e*, and the driving component 12*e* may be electrically connected to the peripheral circuit in the peripheral region 12*c* through the circuit board 12*d*, but not limited thereto. The circuit board 12*d* may include, for example, a flexible circuit board or a rigid circuit board, but not limited thereto.

In FIG. 1, the case 14 may have a body portion 14*a*, a first side portion 14*b* and a second side portion 14*c*, and the first side portion 14*b* and the second side portion 14*c* may be respectively connected to two sides of the body portion 14*a*, but not limited thereto. The body portion 14*a* may have a telescopic function, so that the electronic device 1 may be expanded and rolled up. A width of the opening OP1 of the case 14 in a first direction D1 may be substantially defined by a distance between the first side portion 14*b* and the second side portion 14*c* in the first direction D1. The first direction D1 may be for example an expandable direction of the electronic device 1. In some embodiments, the first side portion 14*b* may be used to shield the mechanism 16, and the second side portion 14*c* may be used to shield the peripheral region 12*c*, but not limited thereto. Although the opening OP1 shown in the present disclosure is a rectangle, it is not limited thereto. A shape of the opening OP1 may be adjusted according to requirements. The case 14 may include, for example, an opaque material to shield components located in the case 14, but not limited thereto. The case 14 may be composed of a single material or multiple materials according to requirements.

Figure 2:
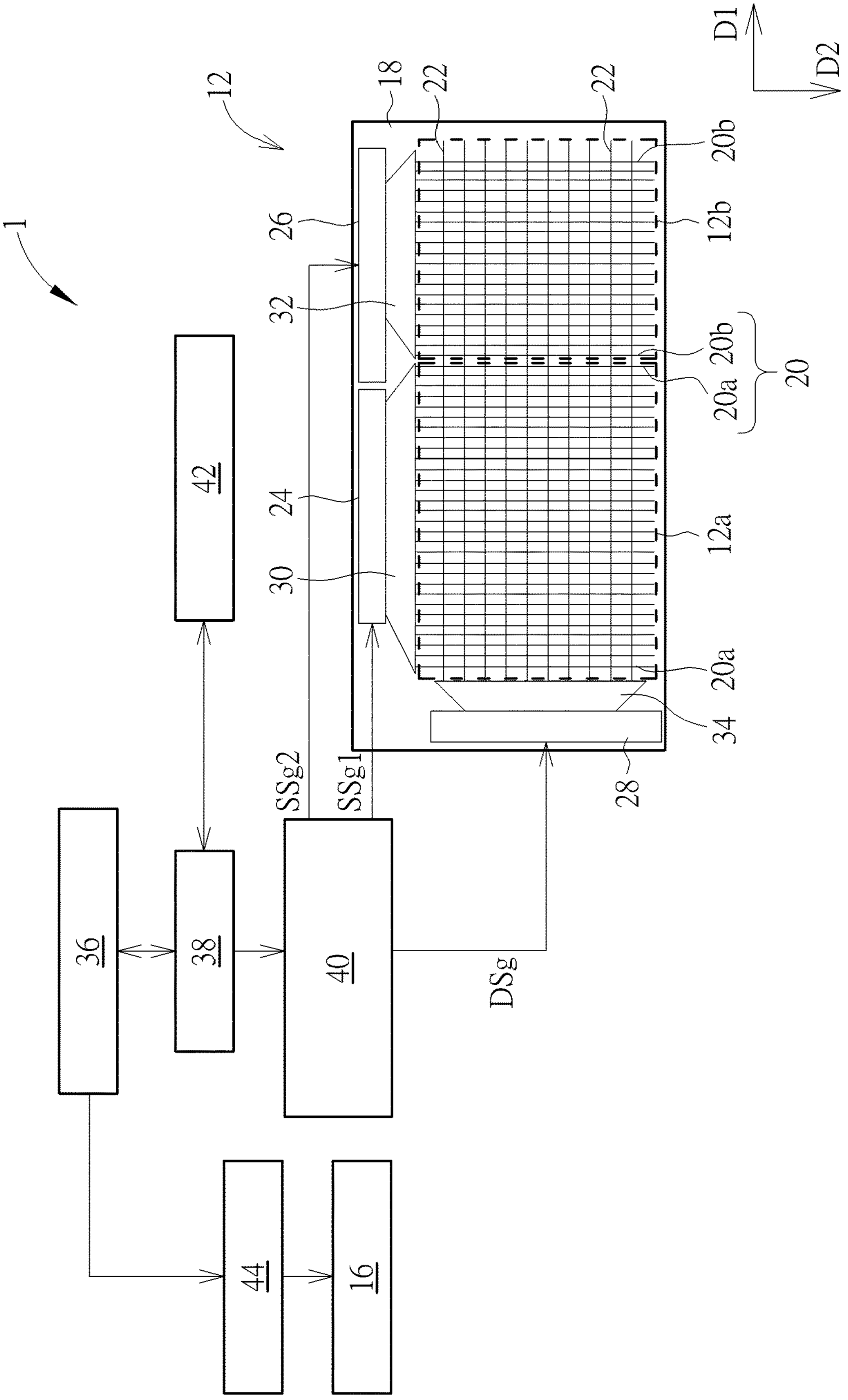
FIG. 2 schematically illustrates a connection of components of the electronic device according to an embodiment of the present disclosure.

FIG. 2 schematically illustrates a connection of components of the electronic device according to an embodiment of the present disclosure. As shown in FIG. 2, the display panel 12 may include a substrate 18, a plurality of scan lines 20, and a plurality of data lines 22. The scan lines 20 and the data lines 22 may be disposed on the substrate 18 and used for transmitting signals to the pixel units in the display panel 12. For example, the data lines 22 may extend along the first direction D1, the scan lines 20 may extend along the second direction D2, and the first direction D1 may be different from the second direction D2. The first direction D1 may be for example perpendicular to the second direction D2. The first direction D1 and the second direction D2 may be perpendicular to the top view direction VD. In some embodiments, the data lines 22 may for example extend from the first region 12*a* to the second region 12*b* of the display panel 12, but not limited thereto. In some embodiments, the scan lines 20 may include for example a plurality of scan lines 20*a* and a plurality of scan lines 20*b*, in which the scan lines 20*a* may be located in the first region 12*a*, and the scan lines 20*b* may be located in the second region 12*b*. In some embodiments, the number of the scan lines 20*a* and the number of the scan lines 20*b* may be the same or different.

In the embodiment of FIG. 2, the display panel 12 may include at least one source driving component 28 and at least one gate driving circuit (e.g., the first gate driving circuit 24 and/or the second gate driving circuit 26) disposed on the substrate 18, but not limited thereto. In the embodiment of FIG. 2, the display panel 12 may further include a wire group 34, a wire group 30 and/or a wire group 32 disposed on the substrate 18. In detail, the first gate driving circuit 24 may be electrically connected to the scan lines 20*a* through the wire group 30 to control switches of the pixel units in the first region 12*a*, and the source driving component 28 may be electrically connected to the data lines 22 through the wire group 34 to provide data signals to the first region 12*a*, such that the first image may be displayed in the first region 12*a*. In detail, the second gate driving circuit 26 may be electrically connected to the scan lines 20*b* through the wire group 32 to control switches of the pixel units in the second region 12*b*, and the source driving component 28 may be electrically connected to the data lines 22 to provide data signals to the second region 12*b*, such that the second image may be displayed in the second region 12*b*. Although not shown in FIG. 2, each of the wire group 30, the wire group 32, and the wire group 34 may include a plurality of wires. In other embodiments (not shown), the switches of the pixel units in the first region 12*a* may be controlled by a plurality of gate driving circuits. In other embodiments (not shown), the switches of the pixel units in the second region 12*b* may be controlled by a plurality of gate driving circuits. It should be noted that the first image is "displayed" in the first region 12*a* mentioned herein may refer to all the scan lines 20*a* in the first region 12*a* are scanned completely one time, and the pixel units in the first region 12*a* may generate the first image according to the data signals received by the data lines 22 electrically connected to the pixel units in the first region 12*a*. Similarly, the second image is "displayed" in the second region 12*b* mentioned herein may refer to at least one scan line 20*b* in the second region 12*b* is scanned one time, and the pixel units in the second region 12*b* may generate the second image according to the data signals received by the data lines 22 electrically connected to the pixel units in the second region 12*b*. In some embodiments, the first image may be displayed in the first region 12*a* according to the first gate driving circuit 24, and the second image may be displayed in the second region 12*b* according to the second gate driving circuit 26. The arrangement of the gate driving circuit and the source driving component of the present disclosure are not limited to those shown in FIG. 2. It should be noted that, the first gate driving circuit 24 and the second gate driving circuit 26 may control the scan lines 20*a* in the first region 12*a* and the scan lines 20*b* in the second region 12*b*, respectively, such that in the first status S1, the first gate driving circuit 24 may be turned on, and the second gate driving circuit 26 is turned off to save power consumption.

In some embodiments, the gate driver circuit may include agate driver on panel (GOP) or a gate driver chip, but not limited thereto. In the embodiment of FIG. 2, each of the first gate driving circuit 24 and the second gate driving circuit 26 may include a plurality of thin film transistors (not shown), but not limited thereto. In some embodiments, a ratio of a channel width to a channel length of one of the thin film transistors of the first gate driver circuit 24 may be the same or different from a ratio of a channel width to a channel length of one of the thin film transistors of the second gate driver circuit 26, but not limited thereto. In some embodiments, the number of the thin film transistors of the first gate driver circuit 24 may be different from the number of the thin film transistors of the second gate driver circuit 26. In some embodiments, a semiconductor layer of one of the thin film transistors of the first gate driver circuit 24 may be different from a semiconductor layer of one of the thin film transistors of the second gate driver circuit 26. For example, the semiconductor layer of the first gate driving circuit 24 may include low temperature polysilicon, and the semiconductor layer of the second gate driving circuit 26 may include oxide semiconductor, but not limited thereto. Since using frequency of the first region 12*a* and using frequency of the second region 12*b* may be different, for example, the thin film transistors of the first gate driving circuit 24 and the thin film transistors of the second gate driving circuit 26 may have different designs or structures to reduce uneven brightness or uneven chromaticity of the first image and the second image.

As shown in FIG. 2, the electronic device 1 may include a processing unit 36, a driving component 38 and/or a timing control component 40, but not limited thereto. For example, the processing unit 36 may be electrically connected to the driving component 38, and the driving component 38 may be electrically connected to the timing control component 40. The timing control component 40 may, for example, be electrically connected to the source driving component 28, the first gate driving circuit 24 and/or the second gate driving circuit 26. In some embodiments, a control signal SSg1 may be transmitted to the first gate driving circuit 24 through the timing control component 40, and a control signal SSg2 may be transmitted to the second gate driving circuit 26 through the timing control component 40, but not limited thereto. In some embodiments, a control signal DSg may be transmitted to the source driving component 28 through the timing control component 40, but not limited thereto.

In the embodiment of FIG. 2, the electronic device 1 may optionally further include a sensing component 42 for example for detecting a touch position of the user, and the sensing component 42 may be electrically connected to the driving component 38. In some embodiments, the driving component 38 may include, for example, a touch driving chip, a display driving chip, or a combination thereof. The driving component 38 may be used for example for driving the sensing component 42 and/or the display panel 12.

As shown in FIG. 2, the processing unit 36 may be electrically connected to the control component 44, and the control component 44 may be electrically connected to the mechanism 16 to switch status of the electronic device 1 (e.g., the unexpanded status or the expanded status) through the mechanism 16, but not limited thereto.

Figure 3:
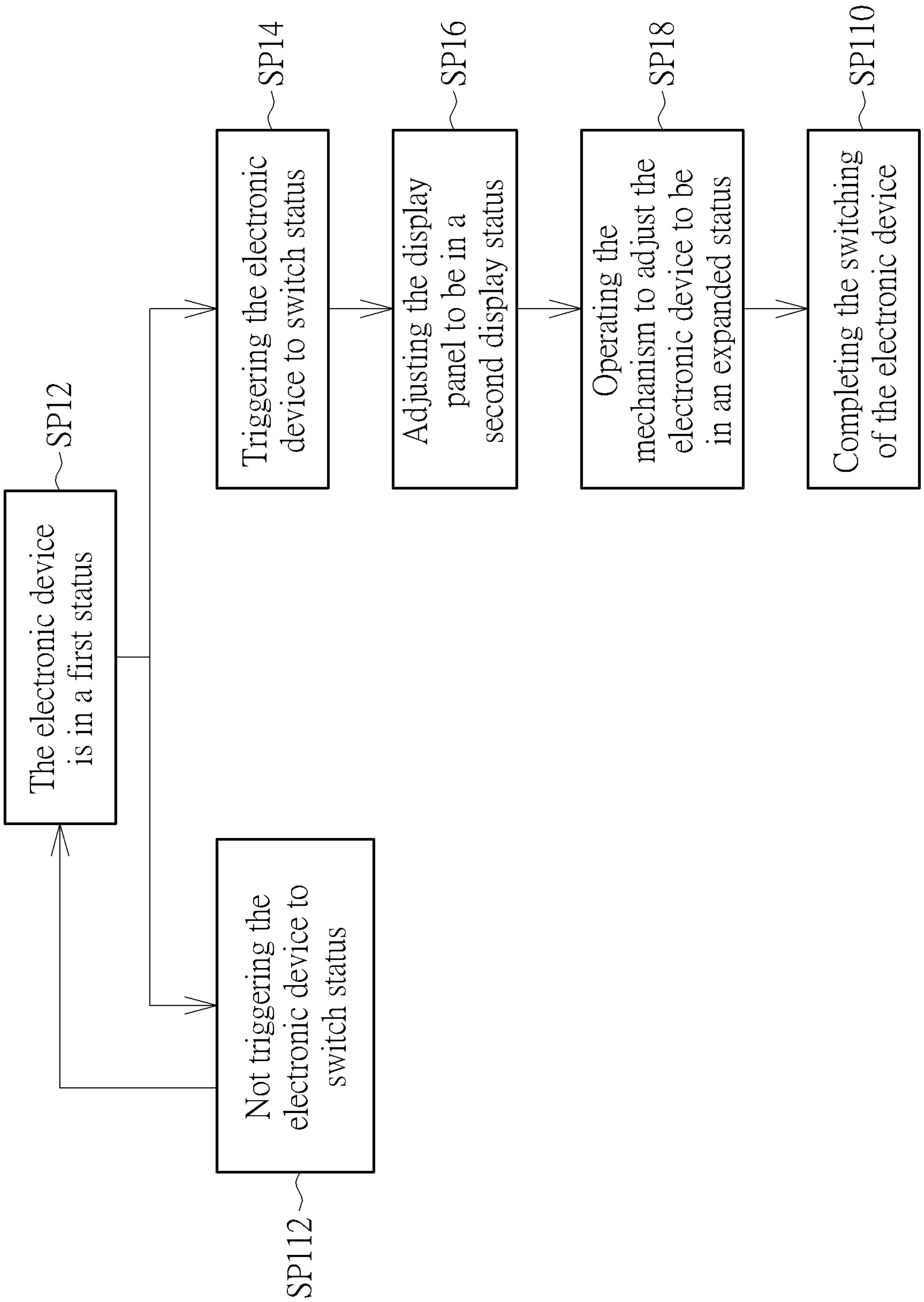
FIG. 3 schematically illustrates a flowchart of a method for operating an electronic device according to an embodiment of the present disclosure.
Figure 4:
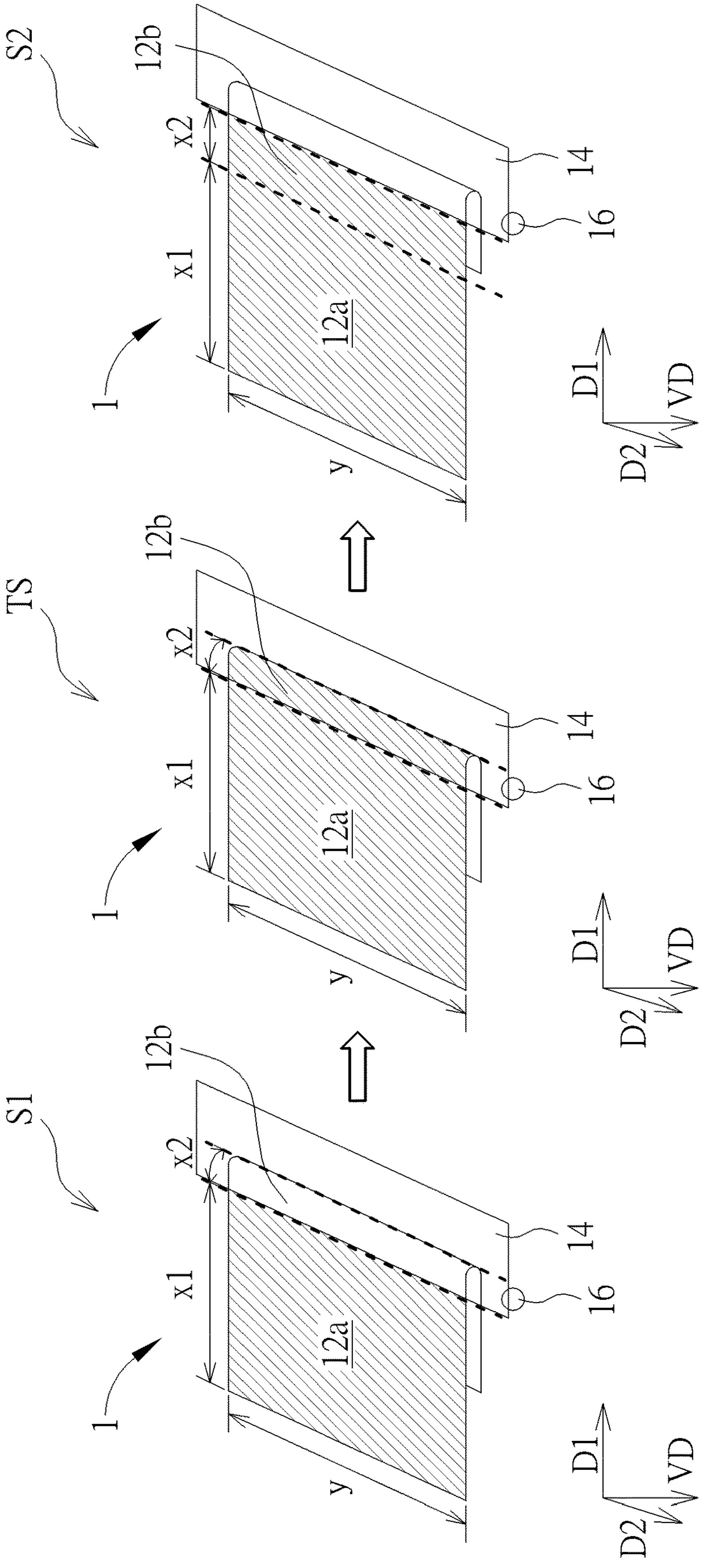
FIG. 4 schematically illustrates structures in different steps from the unexpanded status to the expanded status of the electronic device according to an embodiment of the present disclosure.
Figure 5:
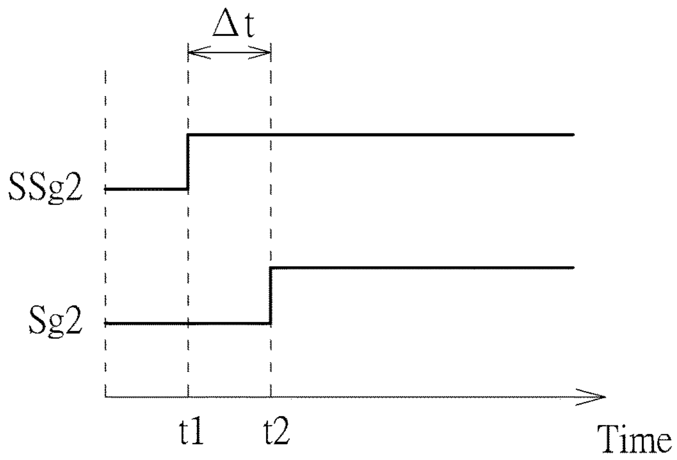
FIG. 5 schematically illustrates timing sequences of displaying the second image in the second region and operation of the mechanism according to an embodiment of the present disclosure.

FIG. 3 schematically illustrates a flowchart of a method for operating an electronic device according to an embodiment of the present disclosure, FIG. 4 schematically illustrates structures in different steps from the unexpanded status to the expanded status of the electronic device according to an embodiment of the present disclosure, and FIG. 5 schematically illustrates timing sequences of displaying the second image in the second region and operation of the mechanism according to an embodiment of the present disclosure. For clarity, FIG. 4 just shows a portion of the case 14 adjacent to the second region 12*b*. As shown in FIG. 3, the method for operating the electronic device 1 may include step SP12 to step SP112 and is described below with reference to FIG. 4 to FIG. 5, but not limited thereto. In the present disclosure, other steps may be inserted or some of the steps may be deleted according to requirements. For example, another step may be performed before, after, or between any two of step SP12 to step SP112, or at the same time as any one of step SP12 to step SP112.

As shown in FIG. 3 and FIG. 4, first in step SP12, the electronic device 1 is, for example, in the first status S1. In the first status S1, the mechanism 16 may, for example, be not operated, so that the electronic device 1 is in the unexpanded status. In the first status S1, the first image may for example be displayed in the first region 12*a* of the display panel 12, and no image may be displayed in the second region 12*b*. At this time, the display panel 12 may for example be in a first display status. It should be noted that, as shown in FIG. 4, in the first status S1, the first image displayed in the first region 12*a* may be for example exemplified by slash pattern. Taking the rectangular opening OP1 in FIG. 4 as an example, in the first status S1, a size of the opening OP1 may be for example substantially equal to an area of the first region 12*a*, and the area of the first region 12*a* may be for example a product of a length y and a width x1. The width x1 may be, for example, a width of the first region 12*a* in the first direction D1, and the length y may be, for example, a length of the first region 12*a* in the second direction D2.

As shown in FIG. 3 and FIG. 4, in step SP14, the electronic device 1 is triggered to switch status, so that the electronic device 1 may start to switch from the first status S1 to the second status S2. For example, the user may optionally trigger the electronic device 1 to switch status through a button, a switch or a program of the electronic device 1, but not limited thereto. In some embodiments, the electronic device 1 may be triggered by, for example, biometric identification, touch sensing, voice control, or other suitable methods to switch status, but not limited thereto.

As shown in FIG. 2 to FIG. 5, after the electronic device 1 is triggered, the electronic device 1 receives a trigger signal for example through the processing unit 36 and provides a control signal (such as the control signal SSg2) to the gate driving circuit (such as the second gate driving circuit 26), thereby turning on the pixel units in the second region 12*b*, but not limited thereto. When the pixel units in the second region 12*b* are turned on, and these pixel units receive the data signals, step SP16 may be performed for example. In step SP16, the display panel 12 may be adjusted into the second display status. Specifically, in step SP16, the second region 12*b* of the display panel 12 may display the second image, and the first image displayed in the first region 12*a* and the second image displayed in the second region 12*b* may for example form a single image or be different images, such that the display panel 12 may be adjusted into the second display status. In some embodiments, in step SP16, the display panel 12 may be adjusted from the first display status to the second display status for example through the driving component 38, but not limited thereto. It should be noted that, before step SP16 is completed, the mechanism 14 may not be operated for example, such that the electronic device 1 is still in the first status S1 (unexpanded status).

Referring to FIG. 2 to FIG. 5, when the second region 12*b* is still covered by the case 14, the second image may be displayed in the second region 12*b* of the display panel 12 at a first time point t1. As shown in FIG. 4, the electronic device 1 may be in a temporary status TS at this time. In the temporary status TS, the second image (represented by the slash pattern) may be displayed in the second region 12*b*, and the first image may be displayed in the first region 12*a* (represented by the slash pattern). At this time, the display panel 12 may be referred to as being in the second display status, for example. When the electronic device 1 is in the temporary status TS, the second image displayed in the second region 12*b* may for example not be exposed by the opening OP1 of the case 14; that is, the second image displayed in the second region 12*b* is still covered by the case 14. Accordingly, the user does not view the second image yet.

It should be noted that the above-mentioned first time point t1 may be for example a time point when one of the scan lines 20*b* in the second region 12*b* closest to the first region 12*a* receives a control signal (e.g., the control signal SSg2) to transmit a scan signal to the pixel units electrically connected to this scan line 20*b*, but not limited thereto. It should be noted that, a manner of displaying the second image may be, for example, transmitting a control signal (e.g., the control signal SSg2) to the scan lines 20*b* in the second region 12*b*, and these scan lines 20*b* may transmit the scan signals in sequence and turn on the pixel units electrically connected to these scan lines 20*b*, but not limited thereto. In some embodiments, the display panel 12 may for example turn on all the pixel units in the second region 12*b* in one frame time, and these pixel units may display the second image through receiving the data signals. Alternatively, the display panel 12 may turn on all the pixel units in the second region 12*b* in a plurality of frame times, and these pixel units may receive the data signals to display the second image.

As shown in FIG. 2 to FIG. 5, after the electronic device 1 receives the trigger signal, another control signal Sg2 may be transmitted to the mechanism 16, for example, through the processing unit 36 or other suitable components (such as the control component 44 shown in FIG. 2), but not limited thereto. When the mechanism 16 receives the control signal Sg2, step SP18 may be performed to operate the mechanism 16, such that the electronic device is adjusted to be in the expanded status. As shown in FIG. 2 to FIG. 5, the mechanism 16 may be operated to move the second region 12*b* out of (or to be exposed by) the case 14 for example at a second time point t2. In other words, the second region 12*b* starts to be moved and exposed by the case 14 at the second time point t2. In other embodiments, the second region 12*b* may not be moved by the operation of the mechanism 16, and the second region 12*b* may be moved manually, for example. In other embodiments, the user may be notified to perform the operation of moving the second region 12*b* in a specific manner, but not limited thereto.

It should be noted that, in the embodiment of FIG. 5, the first time point t1 may be, for example, not later than the second time point t2. That is, a time point when the second image starts to be displayed in the second region 12*b* (the first time point t1) may be, for example, earlier than a time point when the mechanism 16 starts to operate (the second time point t2), so that the user does not view the pixel units in the second region 12*b* that are not turned on. That is, the user does not view a portion of the second region 12*b* that does not display the second image, thereby improving comfort of the user in viewing the electronic device 1 when the electronic device 1 is switched from the first status S1 to the second status S2.

As shown in FIG. 5, in some embodiments, an interval Δt between the first time point t1 and the second time point t2 may be greater than or equal to one frame time of the display panel 12 and less than or equal to 100 frame times of the display panel 12 (that is, one frame time≤Δt≤100 frame times), but not limited thereto. In some embodiments, the second time point t2 may be the same as the first time point t1. In some embodiments, the interval Δt may be greater than or equal to 0 second(s) and less than or equal to 4 s (i.e., 0 s≤Δt≤4 s), or may be greater than or equal to 16 milliseconds (ms) and less than or equal to 2 seconds (i.e., 16 ms≤Δt≤2 s), or may be greater than or equal to 16 ms and less than or equal to is (i.e., 16 ms≤Δt≤1 s).

As shown in FIG. 3 and FIG. 4, after step SP18 of "operating the mechanism 16 to adjust the electronic device 1 to be in the expanded status", the second region 12*b* may be moved out of (or to be exposed by) the case 14, for example. Subsequently, step SP110 may be performed to complete the switching of the electronic device 1, and the electronic device 1 after switching may be in the second status S2. In the second status S2, a display area of the electronic device 1 may be, for example, approximately a sum of the area of the first region 12*a* and the area of the second region 12*b*. Specifically, the display area of the electronic device 1=(the length y)×(the width x1)+(the length y)×(the width x2), but not limited thereto. The length y is the length of the first region 12*a* and/or the second region 12*b* in the second direction D2, the width x1 is the width of the first region 12*a* in the first direction D1, and the width x2 is the width of the second region 12*b* in the first direction D1.

In addition, as shown in FIG. 3, step SP112 is performed from step SP12, and step SP112 is that the electronic device 1 is not triggered to switch status. At this time, the method of operating the electronic device 1 may include returning to step SP12 to make the electronic device 1 be in the first status S1. In some embodiments, another step may be performed before, after, or at the same time as step SP112. In other embodiments (not shown), when the method of switching the electronic device 1 from the second status S2 to the first status S1 is, for example, after the status switching is triggered, the mechanism 16 may be started first, such that the mechanism 16 may be operated to adjust the electronic device 1 into the first status S1 (unexpanded status) and then optionally adjust the display panel into the first display status to close the second image in the second region 12*b*, but not limited thereto.

Figure 6:
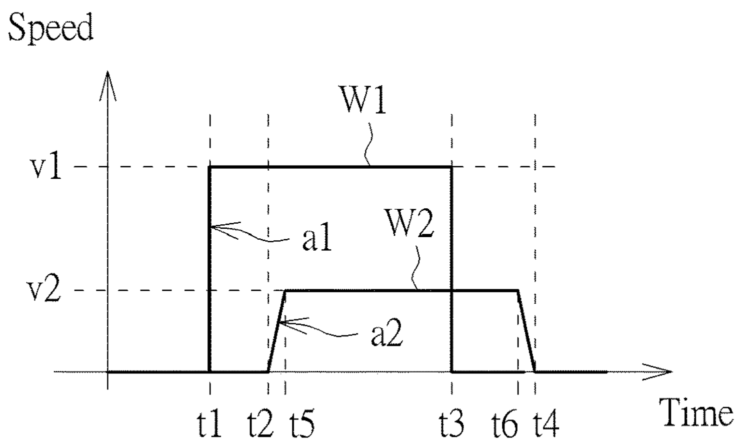
FIG. 6 is a schematic diagram illustrating a relationship between speed and time of displaying an image in the second region and a relationship between speed and time of operating the mechanism according to an embodiment of the present disclosure.

FIG. 6 is a schematic diagram illustrating a relationship between speed and time of displaying an image in the second region and a relationship between speed and time of operating the mechanism according to an embodiment of the present disclosure. As shown in FIG. 6, in some embodiments, a time for displaying the second image may for example be from the first time point t1 to a third time point t3. In other words, the second region 20*b* starts to display the second image at the first time point t1, and the second image is completely displayed in the second region 20*b* at the third time point t3. In some embodiments, a time for operating the mechanism 16 to move the second region 20*b* out of (or to be exposed by) the case 14 for example be from the second time point t2 to a fourth time point t4. In other words, the second region 12*b* is completely moved out of (or to be exposed by) the case 14 at the fourth time point t4. Also, a time for adjusting the electronic device 1 from the first status S1 (unexpanded status) to the second status S2 (expanded status) is for example from the second time point t2 to the fourth time point t4. In some embodiments, the third time point t3 is not later than the fourth time point t4.

In some embodiments, the second image may be displayed in the second region 12*b*, for example, in a first speed. The second region 12*b* may be moved out of (or to be exposed by) the case 14, for example, in a second speed. The first speed may be greater than or equal to the second speed, thereby reducing a chance that the user views discontinuous images during the steps of adjusting the electronic device 1 from the unexpanded status to the expanded status. Please refer to FIG. 2 to FIG. 6, the first speed of displaying the second image in the second region 20*b* may be calculated by, for example, a formula: the first speed=x2/((FT/TN)×FN×N(x2)), in which x2 may be the width of the second region 12*b* in the first direction D1 after being expanded (such as the width x2 shown in FIG. 4), FT may be a time of the second region 12*b* displaying one frame, TN may be a total number of the scan lines in the second region 12*b*, FN may be the number of frames scanned by the second region 12*b* during displaying the second image, and N(x2) may be the number of scan lines that are turned on in one frame. It should be noted that, FT, TN, FN and N(x2) may be changed according to the driving design of the display panel 12, for example. Taking FIG. 2 as an example, when the first region 12*a* and the second region 12*b* are respectively driven by the first gate driving circuits 24 and the second gate driving circuits 26 that are different from each other, the total number of the scan lines TN may be the total number of the scan lines 20*b* in the second region 12*b*, and the frame time FT may be the time of the second region 12*b* displaying one frame, but not limited thereto.

In some embodiments, when the first region 12*a* and the second region 12*b* are driven by the same gate driving circuit, for example as shown in the following FIG. 9, the total number of the scan lines TN may be the total number of the scan lines of the entire display panel 12, and the frame time FT may be the time of the first region 12*a* and the second region 12*b* displaying one frame.

In some embodiments, the second speed in which the second region 20*b* is moved out of the case 14 may be, for example, "the width x2 of the second region 12*b* in the first direction D1 after being expanded" divided by "the time for switching from the unexpanded status to the expanded status (i.e., the interval between the second time point t2 and the fourth time point t4)", the second speed=width (x2)/(the fourth time point (t4)−the second time point (t2)). As mentioned above, the second speed may be, for example, the average speed in which the second region 12*b* is expanded. When the second speed is too low, the user's waiting time will be too long, and when the second speed is too high, the display panel 12 will be subjected to greater stress and the disconnection problem may be easily caused. Therefore, the second speed may be, for example, greater than or equal to 0.8 centimeter/second (cm/s) and less than or equal to 10 cm/s (i.e., 0.8 cm/s≤the second speed≤10 cm/s), so as to reduce disconnection of the display panel or reduce the user from waiting too long.

As shown in FIG. 4 and FIG. 6, a curve W1 may represent a relationship between speed and time of displaying the second image in the second region 12*b*. As can be seen from the curve W1, the second region 12*b* starts to turn on the pixel units from the first time point t1 and reaches a first stable speed v1 for example in a very short time (e.g., equal to 10 ms or 1 ms, or less than milliseconds). The second region 12*b* may for example continuously turn on the pixel units in the first stable speed v1 to display the second image. The second image may be completely displayed in the second region 12*b*, for example, at the third time point t3. A first acceleration a1 of displaying the second region 12*b* may be, for example, speed of light divided by the time required for turning on one scan line.

As shown in FIG. 4 and FIG. 6, the curve W2 may represent a relationship between speed and time of the mechanism 16 in the first direction D1. As can be seen from the curve W2, the mechanism 16 may start to operate at the second time point t2, so that the second region 12*b* is moved out of the case 14 at the second time point t2. The second region 12*b* may, for example, be moved in the second acceleration a2 and reach the second stable speed v2 at a fifth time point t5. In addition, the second region 12*b* may, for example, be moved in a second stable speed v2 and continue until a sixth time point t6. In addition, the mechanism 16 starts to reduce the speed of the operation at the sixth time point t6, so that the moving speed of the second region 12*b* is reduced until the mechanism 16 stops the operation at the fourth time point t4. Accordingly, the second region 12*b* may be completely moved out of the case 14 at the fourth time point t4. At this time, the electronic device 1 may, for example, be in a completely expanded status. In the embodiment of FIG. 6, the second acceleration a2 may be calculated, for example, by the formula: the second acceleration a2=the second stable speed v2/(the fifth time point t5−the second time point t2). In some embodiments, the first acceleration a1 of the first stable speed v1 may be, for example, greater than the second acceleration a2 of the second stable speed v2.

It should be noted that the third time point t3 (i.e., a time point when the second image is completely displayed in the second region 12*b*) may be, for example, not later than the fourth time point t4 (i.e., a time point when the mechanism 16 stops operating, and the entire second region 12*b* is completely exposed by the case 14), so as to reduce the user from viewing discontinuous frames or improve viewing comfort of the user. In some embodiments, the first stable speed v1 may be, for example, greater than the second stable speed v2 of the mechanism 16 to reduce discomfort of the user during switching status. In addition, in the embodiment of FIG. 6, the third time point t3 may for example be earlier than the fourth time point t4, but not limited thereto. In some embodiments, the third time point t3 may be the same as the fourth time point t4. Furthermore, the second time point t2 shown in FIG. 6 may be, for example, not later than the third time point t3, but not limited thereto. It should be noted that the above time points (e.g., the first time point t1, the second time point t2, the third time point t3, the fourth time point t4, the fifth time point t5 and/or the sixth time point t6) and the above-mentioned speeds (e.g., the first speed, the second speed, the first stable speed v1 and the second stable speed v2) may be detected by, for example, high-speed photography or other suitable methods, but not limited thereto.

The electronic device and the operating method thereof of the present disclosure are not limited to the above-mentioned embodiments and may have different embodiments. In order to simplify description, the different embodiments mentioned below will use the same reference numerals to denote the same components as the above-described embodiments. In order to clearly state the different embodiments, following description will state differences between embodiments, and the repeated parts are not detailed redundantly.

Figure 7:
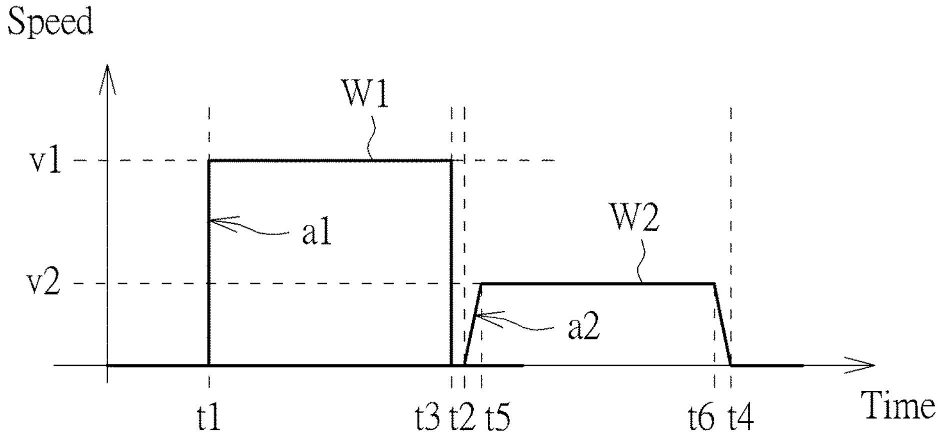
FIG. 7 schematically illustrates a relationship between speed and time of displaying an image in the second region and a relationship between speed and time of operating the mechanism according to some embodiments of the present disclosure.

FIG. 7 schematically illustrates a relationship between speed and time of displaying an image in the second region and a relationship between speed and time of operating the mechanism according to some embodiments of the present disclosure. As shown in FIG. 7, the third time point t3 may be not later than the second time point t2. In other words, the second image may be completely displayed in the second region 12*b* before the mechanism 16 starts to operate to move the second region 12*b*, but not limited thereto. In some embodiments, a relationship between the curve W1 and the curve W2 in FIG. 7 may be adapted to the electronic device 1 of the present disclosure.

Figure 8:
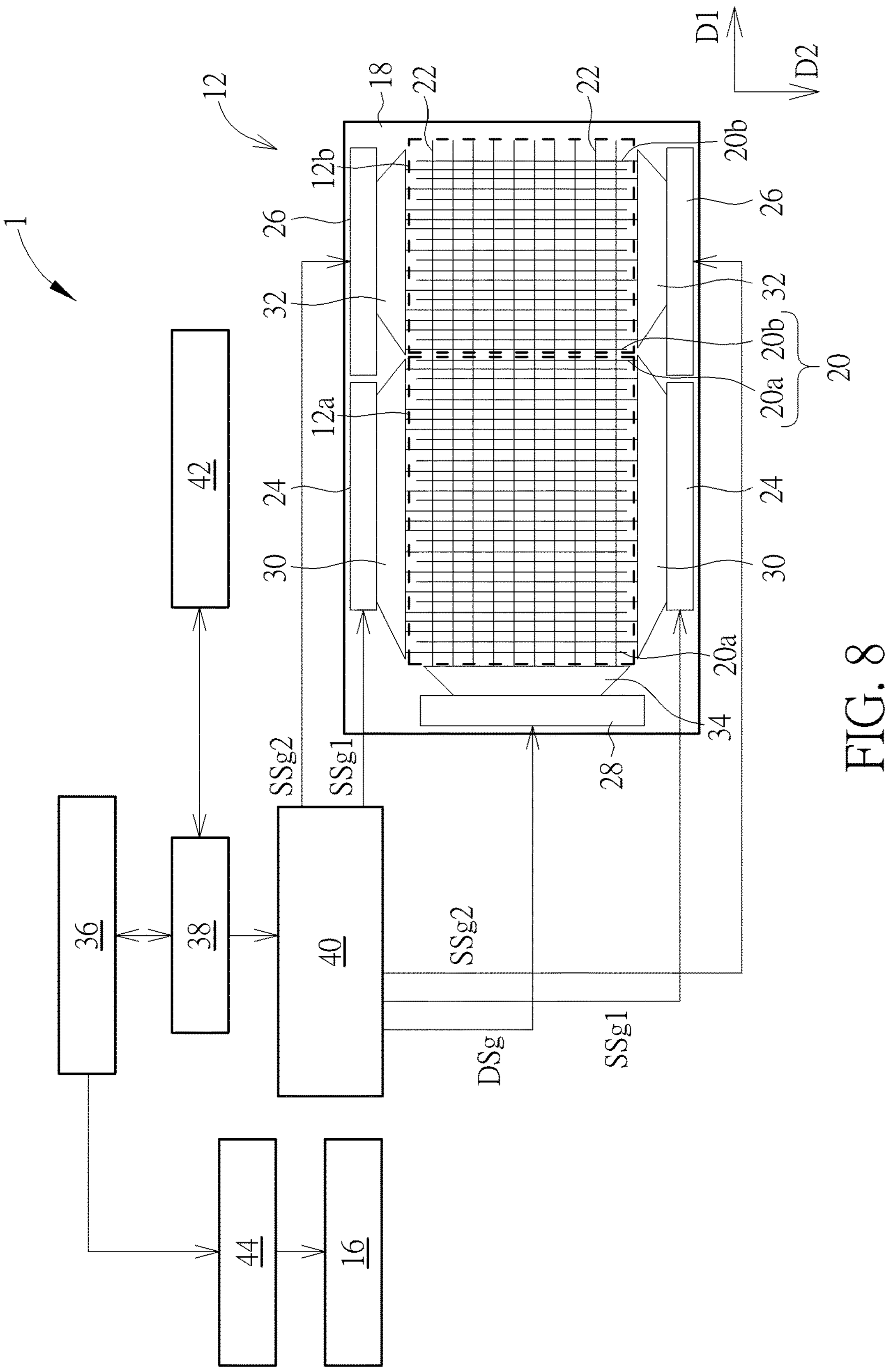
FIG. 8 schematically illustrates a connection of components of an electronic device according to some embodiments of the present disclosure.

FIG. 8 schematically illustrates a connection of components of an electronic device according to some embodiments of the present disclosure. As shown in FIG. 8, the electronic device 1 of this embodiment differs from the electronic device 1 shown in FIG. 2 in that the display panel 12 of this embodiment may include two first gate driving circuits 24 and two second gate driving circuits 26, but not limited thereto. For example, the two first gate driving circuits 24 may be disposed respectively on opposite sides of the first region 12*a* of the display panel 12 and may be electrically connected to different scan lines 20*a* respectively to provide the scan signals to the pixel units in the first region 12*a*. In some embodiments, the two second gate driving circuits 26 may be disposed respectively on opposite sides of the second region 12*b* of the display panel 12 and may be electrically connected to different scan lines 20*b* respectively to provide the scan signals to the pixel units in the second region 12*b*. In some embodiments, counting from one of the scan lines 20*a* in the first region 12*a* that is farthest away from the scan lines 20*a* in the second region 12*b*, odd scan lines 20*a* and even scan lines 20*a* may for example be electrically connected to different first gate driving circuits, respectively. In other embodiments (not shown), the scan lines 20*a* in the first region 12*a* may be divided into a first half and a second half, and the scan lines 20*a* in the first half and the second half may respectively be electrically connected to different first gate driving circuits 24, for example. In some embodiments, counting from one of the scan lines 20*b* in the second region 12*b* adjacent to the first region 12*a*, odd scan lines 20*b* and even scan lines 20*b* may respectively be electrically connected to different second gate driving circuits 26, but not limited thereto. In other embodiments (not shown), the scan lines 20*b* in the second region 12*b* may be divided into a first half and a second half, and the scan lines 20*b* in the first half and the second half may respectively be electrically connected to different second gate driving circuits 26, for example.

Figure 9:
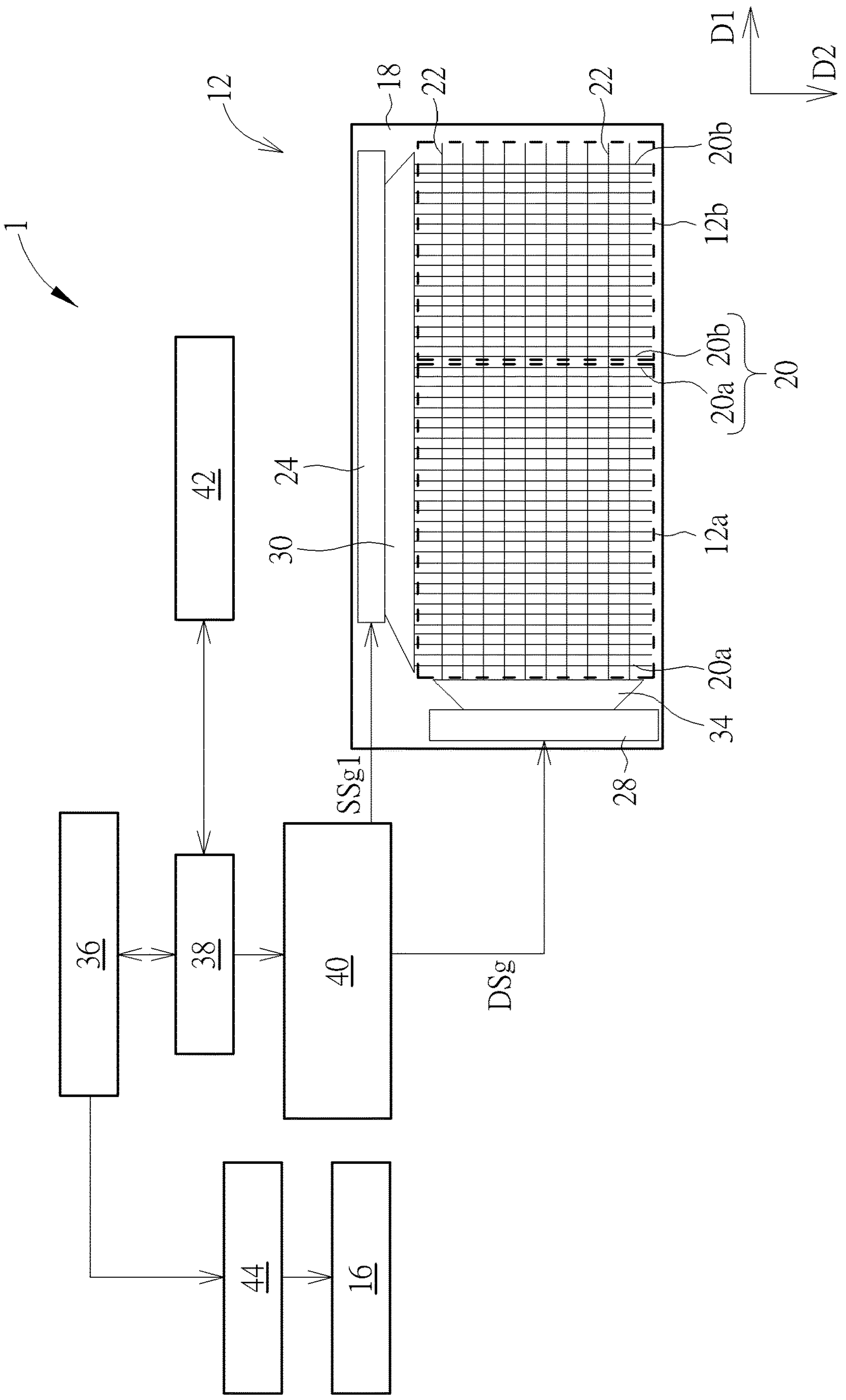
FIG. 9 schematically illustrates a connection of components of an electronic device according to some embodiments of the present disclosure.

FIG. 9 schematically illustrates a connection of components of an electronic device according to some embodiments of the present disclosure. As shown in FIG. 9, the electronic device 1 of this embodiment differs from the electronic device 1 shown in FIG. 2 in that the scan lines 20*a* in the first region 12*a* and the scan lines 20*b* in the second region 12*b* of this embodiment may be electrically connected to the same first gate driving circuit 24, for example. Therefore, in the embodiment of FIG. 9, the first image may be displayed in the first region, and the second image may be displayed in the second region according to the same first gate driving circuit 24. In other embodiments (not shown), the display panel 12 may include two first gate driving circuits 24 respectively disposed on opposite sides of the display panel 12, and the two first gate driving circuits 24 may be electrically connected to the scan lines 20*a* and the scan lines 20*b* different from each other to provide the scan signals to the pixel units in the first region 12*a* and the pixel units in the second region 12*b*, respectively, for example.

Figure 10:
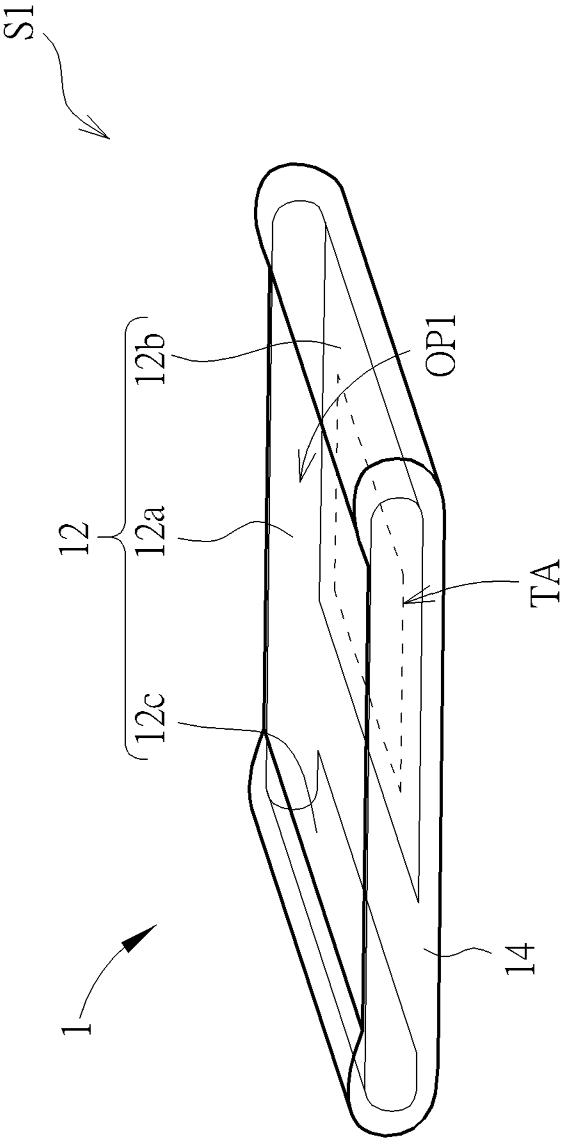
FIG. 10 schematically illustrates an electronic device in a first status according to some embodiments of the present disclosure.

FIG. 10 schematically illustrates an electronic device in a first status according to some embodiments of the present disclosure. As shown in FIG. 10, the electronic device 1 of this embodiment differs from the electronic device 1 shown in FIG. 1 in that the case 14 may include a combination of various materials. For example, the case 14 has a light-transmitting region TA, and the light-transmitting region TA may be formed of, for example, a transparent material, and other portions of the case 14 may be, for example, formed of a non-transparent material, but not limited thereto. In some embodiments, a body portion 14*a* of the case 14 may have a light-transmitting region TA. In the first status S1, the user may view at least a portion of the display panel 12 through the light-transmitting region TA of the case 14, for example, and the at least a portion of the display panel 12 may display other images to improve application field or convenience of usage of the electronic device 1. The at least a portion of the display panel 12 may be, for example, at least a portion of the second region 12*b*, but not limited thereto. For example, through the light-transmitting region TA of the case 14, the user may view simple information, such as date, time or other information. In the embodiment shown in FIG. 10, when the electronic device 1 is switched from the first status S1 to the second status S2, that is, the second region 12*b* is moved to be exposed by the opening OP1, the light-transmitting region TA may optionally display no image, but not limited thereto. In other embodiments (not shown), the light-transmitting region TA in FIG. 10 may be replaced by another opening of the case 14 according to requirements.

In some embodiments, when the display panel 12 includes at least two gate driving circuits for driving the scan lines in the first region 12*a* and the second region 12*b* respectively, such as the first gate driving circuit 24 and the second gate driving circuit 26 shown in FIG. 2 or FIG. 8, the gate driving circuits for driving different regions may have different driving frequencies (i.e., different frame rates), respectively, so that appropriate driving frequency may be selected according to using conditions of different regions, thereby reducing power consumption. In some embodiments, the driving frequency of the first gate driving circuit 24 may be greater than or equal to the driving frequency of the second gate driving circuit 26, but not limited thereto. For example, the driving frequency of the first gate driving circuit 24 and the driving frequency of the second gate driving circuit 26 may be 60 Hz and 30 Hz, or may be 120 Hz and 1 Hz, respectively, but not limited thereto.

Figure 11:
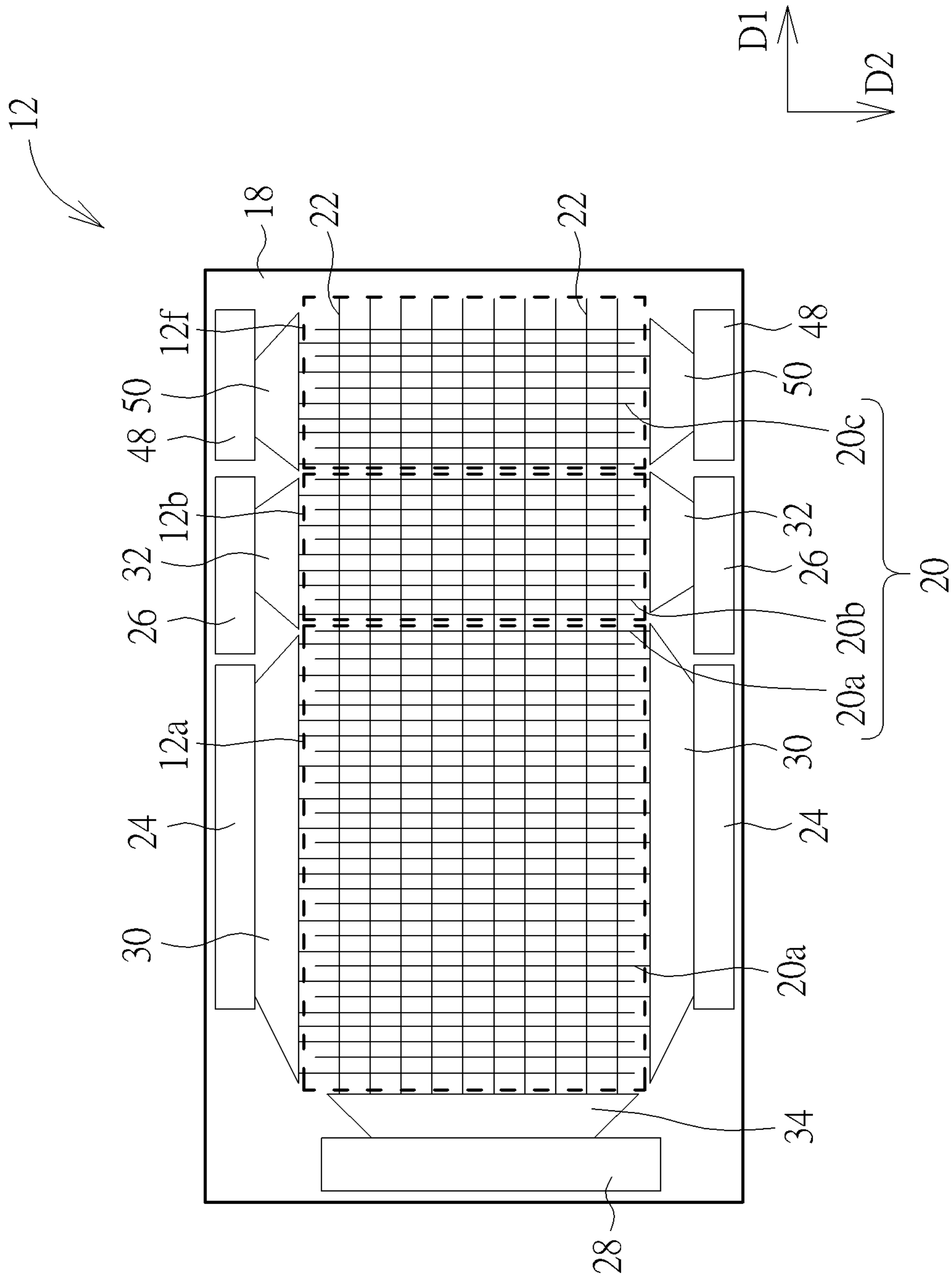
FIG. 11 is a partial schematic diagram of a display panel according to some embodiments of the present disclosure.

FIG. 11 is a partial schematic diagram of a display panel according to some embodiments of the present disclosure. As shown in FIG. 11, the display panel 12 of this embodiment differs from the display panel 12 shown in FIG. 2 in that the display panel 12 may have a first region 12*a*, a second region 12*b* and a third region 12*f*, and the scan lines 20 of the display panel 12 may include scan lines 20*a*, scan lines 20*b*, and/or scan lines 20*c*. In this embodiment, the scan lines 20*a* are disposed in the first region 12*a*, the scan lines 20*b* are disposed in the second region 12*b*, and the scan lines 20*c* are disposed in the third region 12*f*, but not limited thereto. In other embodiments, the display panel 12 may have more regions according to requirements. In addition, another difference between the display panel 12 of this embodiment and the display panel 12 shown in FIG. 2 is that the display panel 12 may further include at least one third gate driving circuit 48 for controlling the switches of the pixel units in the third region 12*f*, but not limited thereto. For example, in the embodiment of FIG. 11, the display panel 12 may further include two third gate driving circuits 48 and two wire groups 50, and the scan lines 20*c* in the third region 12*f* may respectively be electrically connected to different third gate driving circuits 48 through the two wire groups 50. In some embodiments, the display panel 12 of FIG. 11 may be applied to the electronic device of FIG. 10 as an example, and the third region 12*f* may be used to display images through the light-transmitting region TA when the electronic device 1 is in the first status S1, but not limited thereto. In some embodiments, at least two of the driving frequencies of the third gate driving circuit 48, the first gate driving circuit 24 and the second gate driving circuit 26 may be the same or different from each other. In some embodiments, the driving frequency of the third gate driving circuit 48 may be the same as that of the second gate driving circuit 26 and different from that of the first gate driving circuit 24, but not limited thereto. For example, the driving frequency of the first gate driving circuit 24 and the driving frequency of the third gate driving circuit 48 may be 60 Hz and 30 Hz, or 120 Hz and 1 Hz, respectively.

Figure 12:
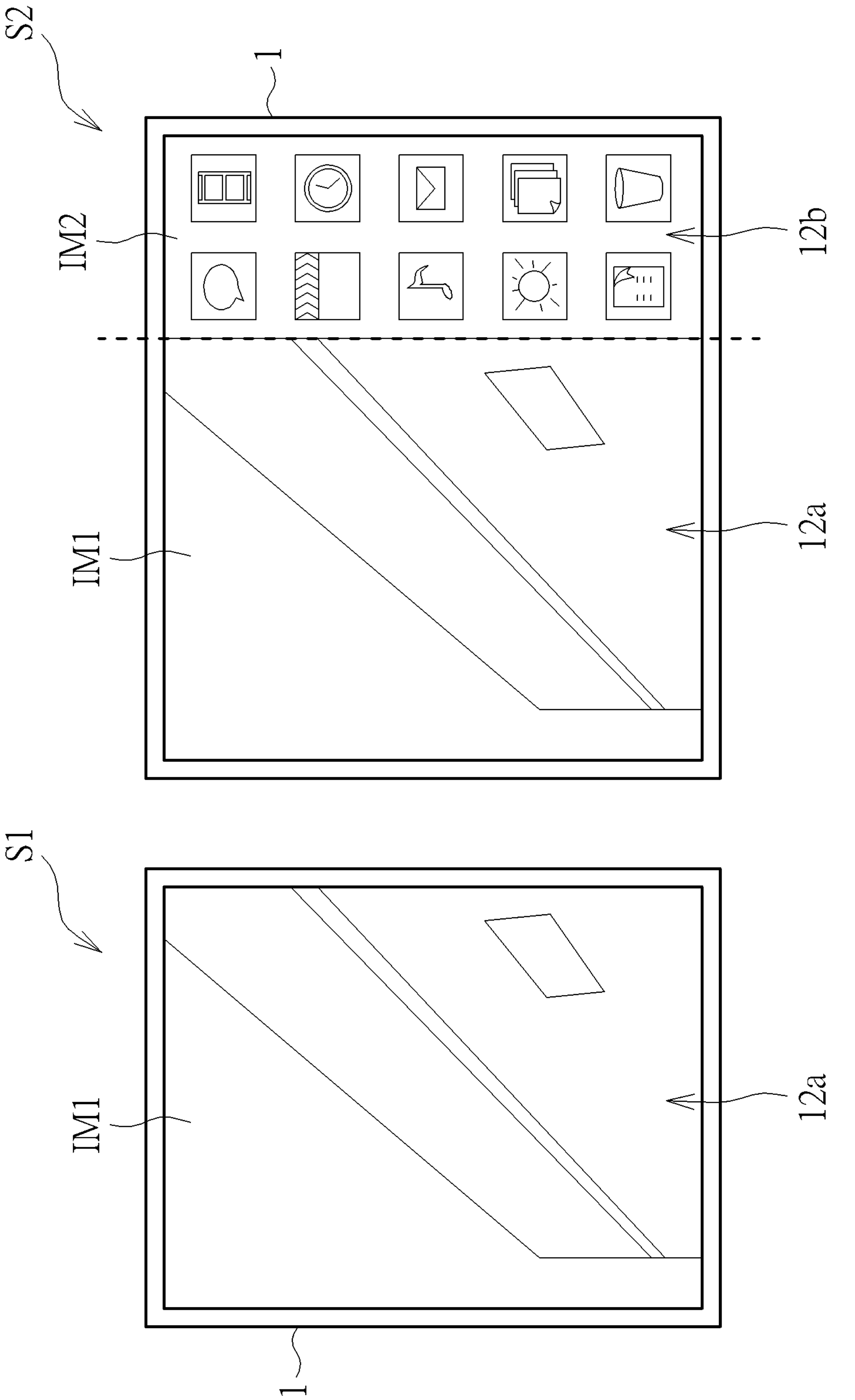
FIG. 12 schematically illustrates images displayed when the electronic device is in the first status and the second status according to some embodiments of the present disclosure.

FIG. 12 schematically illustrates images displayed when the electronic device is in the first status and the second status according to some embodiments of the present disclosure. As shown in FIG. 12, when the electronic device 1 is adjusted from the first status S1 to the second status S2, the second image IM2 displayed in the second region 12*b* may be discontinuous with the first image IM1 displayed in the first region 12*a*, but not limited thereto. For example, the first image IM1 may display a picture image, and the second image IM2 may display a plurality of application (program) patterns or other suitable images.

Figure 13:
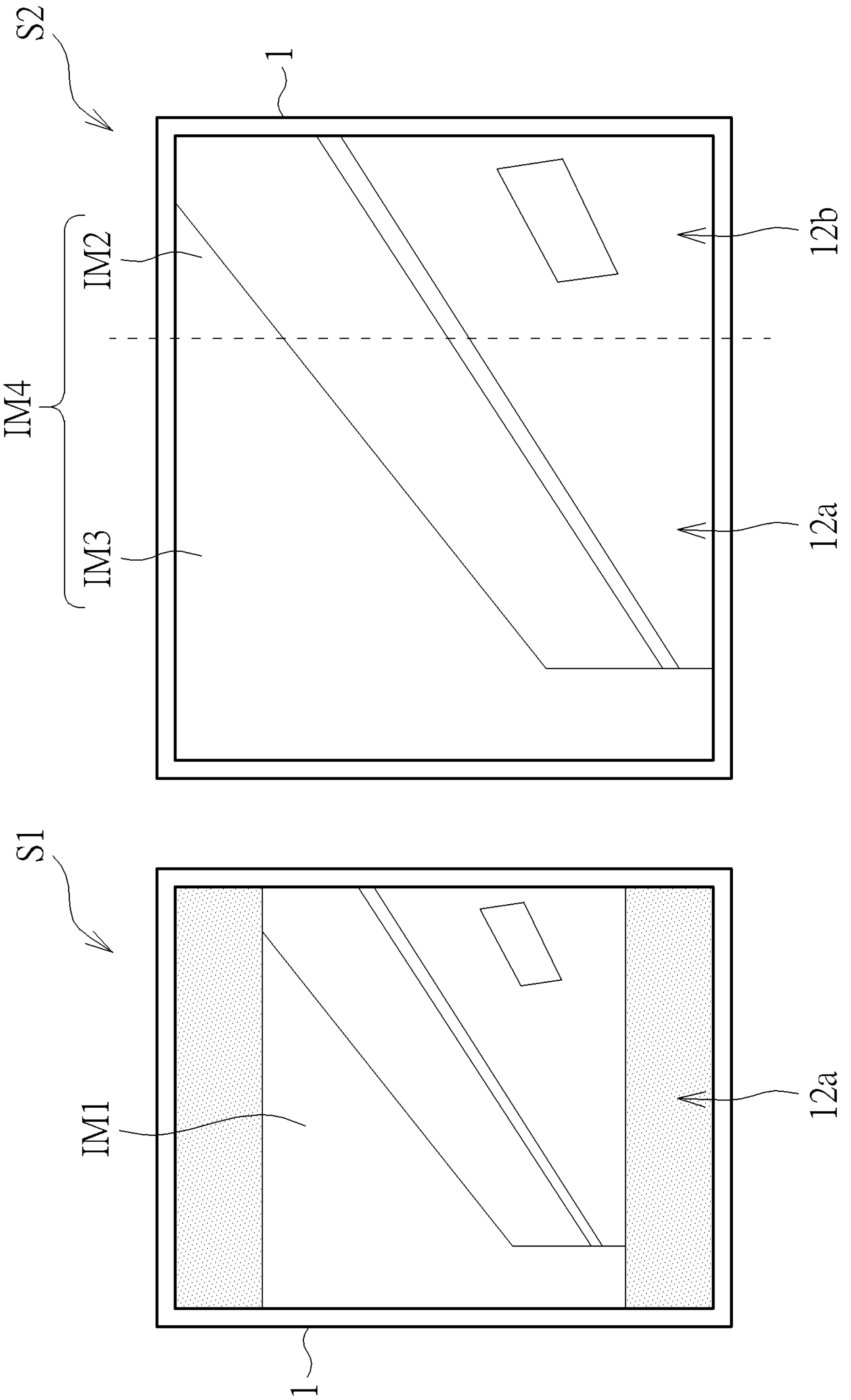
FIG. 13 schematically illustrates images displayed when the electronic device is in the first status and the second status according to some embodiments of the present disclosure.

FIG. 13 schematically illustrates images displayed when the electronic device is in the first status and the second status according to some embodiments of the present disclosure. As shown in FIG. 13, when the electronic device 1 is in the first status S1, the first image IM1 is displayed in the first region 12*a*, and when the electronic device is adjusted to the second status S2, an image IM3 is displayed in the first region 12*a*, and the second image IM2 is displayed in the second region 12*b*. The image IM3 and the second image IM2 may constitute, for example, an image IM4. In the embodiment of FIG. 13, the image IM4 may be, for example, an enlarged picture of the first image IM1, but not limited thereto. In some embodiments, the image IM4 and the first image IM1 may be different pictures or images. In some embodiments, an aspect ratio of the image IM4 may be different from that of the first image IM1. For example, the aspect ratio of the first image IM1 may be 4:3, and the aspect ratio of the image IM4 may be 16:9, but not limited thereto. The aspect ratio of the first image IM1 and the aspect ratio of the image IM4 may be changed according to requirements.

Figure 14:
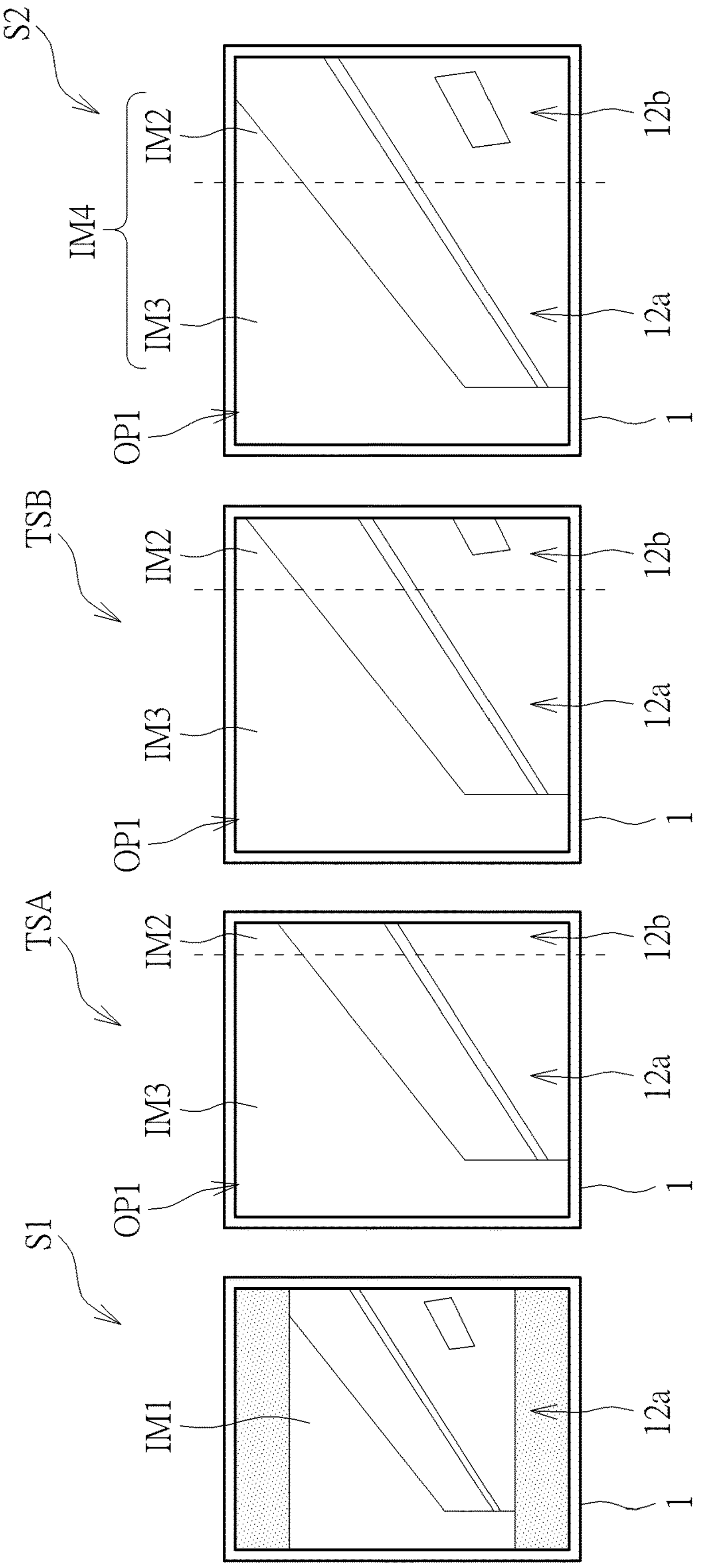
FIG. 14 schematically illustrates images displayed in an electronic device during steps of expanding the electronic device from the first status to the second status according to some embodiments of the present disclosure.

FIG. 14 schematically illustrates images displayed in an electronic device during steps of expanding the electronic device from the first status to the second status according to some embodiments of the present disclosure. As shown in FIG. 14, when the electronic device 1 is adjusted from the first status S1 to the second status S2, the first image IM1 displayed in the first region 12*a* may be converted into the image IM3, and the second image IM2 may be displayed in the second region 12*b*, in which the image IM3 and the second image IM2 may constitute, for example, the image IM4, but not limited thereto. The image IM4 of this embodiment may be similar to or the same as the image IM4 of FIG. 13 and will not repeated herein. Specifically, as shown in FIG. 14, the electronic device 1 may have at least one intermediate status (i.e., an incompletely expanded status) during the step of expanding the electronic device 1 from the first status S1 to the second status S2, in which the intermediate status TSA and the intermediate status TSB may be as an example. In some embodiments, when the electronic device 1 is in the intermediate status TSA or the intermediate status TSB, the second region 12*b* is not completely exposed by the opening OP1; that is, just a portion of the second region 12*b* may be exposed by the opening OP1, and another portion of the second region 12*b* may still be shielded by the case 16 and not exposed by the opening OP1. In some embodiments, when the electronic device 1 is in the intermediate status TSA or the intermediate status TSB, a portion of the second region 12*b* exposed by the opening OP1 may for example display a portion of the second image IM2, and another portion of the second region 12*b* that is not exposed by the opening OP1 may display other portions of the second image IM2, for example. In some embodiments, the numbers of the pixel units in the second region 12*b* respectively turned on in different intermediate statuses (e.g., the intermediate status TSA and the intermediate status) of the electronic device 1 may be the same or different from each other, but not limited thereto.

When the electronic device 1 reaches the second status S2 from the intermediate status TSB, the second region 12*b* may be exposed by the opening OP1 of the case 14 and may display a whole of the second image IM2, such that the electronic device 1 may display a whole of the image IM4, but not limited thereto. It should be noted that, after the electronic device 1 enters the intermediate status TSA and the intermediate status TSB, the image displayed in the first region 12*a* may be directly converted into the image IM3 displayed in the second status S2, and the first region 12*a* may continuously display the fixed image IM3 until the second region 12*b* is completely moved out of (or to be exposed by) the case 14. Accordingly, the electronic device 1 may display a smooth image during switching status, thereby reducing discomfort of the user caused by viewing constantly flickering and changing images.

Figure 15:
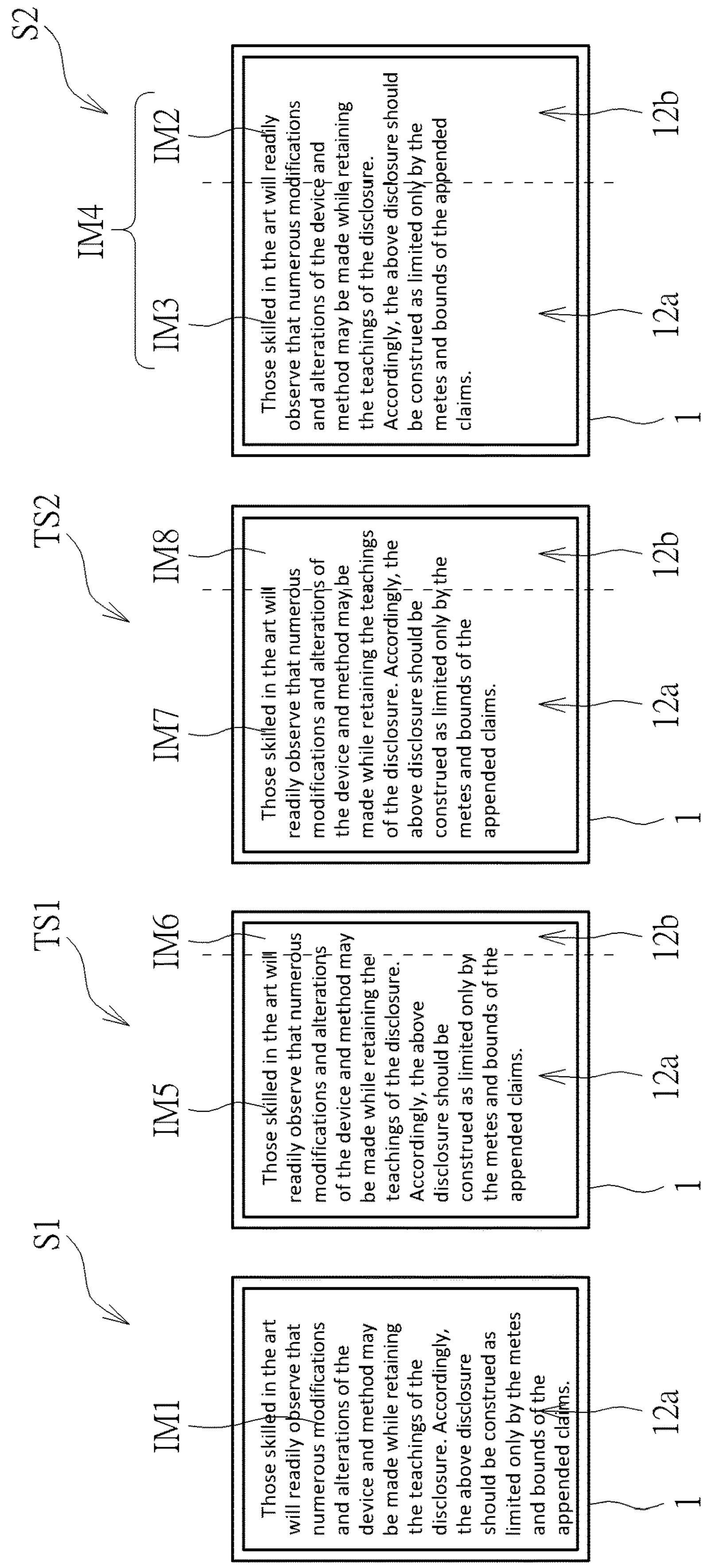
FIG. 15 schematically illustrates images displayed in the electronic device during steps of expanding the electronic device from the first status to the second status according to some embodiments of the present disclosure.

FIG. 15 schematically illustrates images displayed in the electronic device during steps of expanding the electronic device from the first status to the second status according to some embodiments of the present disclosure. As shown in FIG. 15, the operating method of the electronic device 1 of this embodiment differs from the operating method of FIG. 14 in that the images displayed by the electronic device 1 of this embodiment may include, for example, a plurality of texts. During switching status, in order to prevent apart of texts displayed in the first status S1 from being unable to be seen because the part of texts is displayed in the second region 12*b*, the arranging status of the texts displayed in the electronic device 1 may be switched at least one time during the electronic device 1 is expanded from the first status S1 to the second status S2, such that positions or wrapping of the texts displayed in the first status S1 may be adjusted according to size of the display region exposed in the electronic device 1 to display all the texts, but not limited thereto. In the embodiment of FIG. 15, the number of switching times is three as an example, so the electronic device 1 may have two intermediate statuses TS1 and TS2 between the first status S1 and the second status S2, but not limited thereto. Specifically, the electronic device 1 may be switched from the first status S1 to the intermediate status TS1 first. At this time, the image IM5 may be displayed in the first region 12*a*, and the image IM6 may be displayed in the second region 12*b*. The image IM5 and the image IM6 may display all the texts displayed when the electronic device 1 is in the first status S1. For example, the word "will" in the second row in the first status S1 may be moved to the far right of the first row in the intermediate status TS1. Similarly, when the electronic device 1 is adjusted from the intermediate status TS1 to the intermediate status TS2, an exposed portion of the second region 12*b* becomes larger, so that the same row may accommodate more texts. At this time, the image IM7 may be displayed in the first region 12*a*, the image IM8 may be displayed in the second region 12*b*, and the image IM7 and the image IM8 may display all the texts displayed when the electronic device 1 is in the first status S1. By analogy, when the electronic device 1 is switched to the second status S2, such that the second region 12*b* is completely exposed, the image IM3 displayed in the first region 12*a* and the second image IM2 displayed in the second region 12*b* may contain all the texts. In other embodiments, the electronic device 1 may have other numbers of intermediate statuses between the first status S1 and the second status S2.

Figure 16:
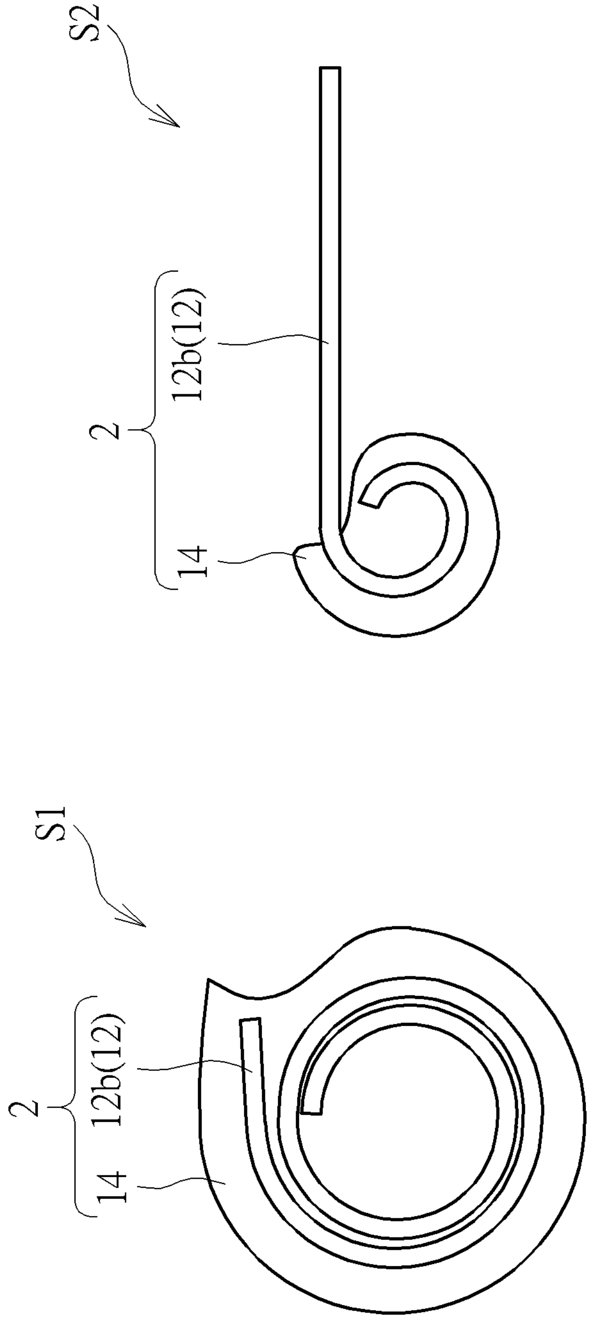
FIG. 16 schematically illustrates an electronic device that is in different statuses according to some embodiments of the present disclosure.

FIG. 16 schematically illustrates an electronic device that is in different statuses according to some embodiments of the present disclosure. As shown in FIG. 16, the electronic device 2 of this embodiment differs from the electronic device 1 shown in FIG. 1 in that the display panel 12 may not have the first region 12*a* exposed by the case 14 in the first status S1. In other words, the display panel 12 of the electronic device 2 may be completely rolled up in the case 14 in the first status S1; that is, the display panel 12 may be completely shielded by the case 14, so that at least a portion of the display panel 12 may be expanded and is not covered by the case 14 in the second status S2.

In summary, in the method for operating the electronic device with the display panel of the present disclosure, "the first time point when the second region of the display panel displays the second image" may be not later than "the second time point when the mechanism is operated to move the second region and start to expose the second region", which may reduce the situation of the user viewing the second region that does not display the second image, thereby improving comfort of viewing the displaying frames.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method for operating an electronic device having a display panel, wherein the display panel has a first region and a second region, the first region is out of a case, the second region is capable of being shielded by the case, and the method comprises:

displaying a first image in the first region;

displaying a second image in the second region at a first time point when the second region is shielded by the case; and moving the second region out of the case at a second time point; wherein the first time point is not later than the second time point, wherein the first image is displayed in the first region according to a first gate driving circuit, and the second image is displayed in the second region according to a second gate driving circuit;

wherein the second image is displayed in a first stable rate, the second region is moved in a second stable speed, and a first acceleration of the first stable rate is greater than a second acceleration of the second stable speed.

2. The method as claimed in claim 1, wherein an interval between the first time point and the second time point is greater than or equal to 0 s and less than or equal to 4 s.

3. The method as claimed in claim 2, wherein the interval is greater than or equal to 16 ms and less than or equal to 2 s.

4. The method as claimed in claim 3, wherein the interval is greater than or equal to 16 ms and less than or equal to 1 s.

5. The method as claimed in claim 1, wherein the second image is displayed in the second region in a first speed, the second region is moved out of the case in a second speed, and the first speed is greater than or equal to the second speed.

6. The method as claimed in claim 1, wherein the second image is completely displayed in the second region at a third time point, the second region is completely moved out of the case at a fourth time point, and the third time point is not later than the fourth time point.

7. The method as claimed in claim 6, wherein the third time point is not later than the second time point.

8. The method as claimed in claim 6, wherein the second time point is not later than the third time point.

* * * * *